United States Patent [19]

Helfenberger

[11] 3,852,437
[45] Dec. 3, 1974

[54] STABLE PESTICIDAL COMPOSITIONS

[75] Inventor: Hans Helfenberger, Reinach, Switzerland

[73] Assignee: Sandoz Ltd., Basle, Switzerland

[22] Filed: Nov. 15, 1971

[21] Appl. No.: 198,988

Related U.S. Application Data

[63] Continuation-in-part of Ser. No. 876,089, Nov. 12, 1969, abandoned, which is a continuation-in-part of Ser. No. 703,280, Feb. 6, 1968, abandoned.

[30] Foreign Application Priority Data

Feb. 7, 1967  Switzerland.......................... 1829/67

[52] U.S. Cl................ 424/200, 424/211, 424/224, 424/225, 424/304
[51] Int. Cl........................... A01n 9/36, A01n 9/06
[58] Field of Search.......... 424/200, 211, 224, 225, 424/304

[56] References Cited

UNITED STATES PATENTS

| | | | |
|---|---|---|---|
| 2,960,432 | 11/1960 | Jones et al. | 424/200 |
| 3,176,035 | 3/1965 | Lutz et al. | 260/461 |
| 3,178,337 | 4/1965 | Lutz et al. | 424/211 |
| 3,232,831 | 2/1966 | Schwint | 424/200 |
| 3,254,105 | 5/1966 | Rosen | 260/453 |

FOREIGN PATENTS OR APPLICATIONS

| | | |
|---|---|---|
| 183,866 | 3/1966 | South Africa |
| 866,396 | 1/1960 | Great Britain |

OTHER PUBLICATIONS

Chemical Abstracts, 53, 23088f, (1959).

Primary Examiner—Albert T. Meyers
Assistant Examiner—D. W. Robinson
Attorney, Agent, or Firm—Gerald D. Sharkin; Richard E. Vila

[57] ABSTRACT

The invention concerns a stabilised insecticidal phosphoric acid ester composition comprising a stabiliser a compound of the formula $$R - N = C = X$$

wherein X is O or N-R and R is H, alkyl of up to 10 carbon atoms, cycloalkyl of from 6 to 8 carbon atoms, phenyl, halophenyl, alkylphenyl, wherein the alkyl group contains up to 4 carbon atoms, nitrophenyl or phenylalkyl of 7 to 9 carbon atoms.

11 Claims, No Drawings

STABLE PESTICIDAL COMPOSITIONS

This is a continuation in part of copending application Ser. No. 876,089, filed on November 12, 1969, which is in turn a continuation in part of application Ser. No. 703,280, filed on Feb. 6, 1968, now both abandoned.

Most of the known (thio)-phosphoric acid esters useful as pesticidal agents have a low stability so that after prolonged storing, especially at elevated temperatures which are encountered in tropical regions, a more or less pronounced decrease in activity occurs and as a consequence thereof a corresponding lowering of their biological or pesticidal effect. (Thio)-phosphoric acid esters degraded in that way can no longer be used in satisfactory manner, either because their effect has been lowered, or because their toxicity towards warm-blooded animals has increased owing to the formation of pyrophosphate, or because it is no longer possible to effect satisfactory emulsification in water, or because the undesired effects of decomposition cause precipitation or a disagreeable smell. The usefulness of these (thio)-phosphoric acid esters is therefore extremely limited.

Since this low stability, to which due consideration must be given also in view of the problem of retention in plant cultures, is inherent in especially valuable insecticidal phosphoric acid or thiophosphoric acid esters having a very low toxicity towards warm-blooded animals, processes for stabilizing emulsion concentrates of such esters by the addition of stabilizing agents have been proposed previously. Such stabilizing agents are, e.g., epichlorohydrin, acetic acid anhydride, glycols, glycol ethers, alkyl sulphates and chelating agents. These previously proposed stabilizing agents, however, are not suitable in all cases to deal with the above mentioned disadvantages; especially they are not suitable for stabilizing (thio)-phosphoric acid esters of 2-hydroxyquinoxalines.

It has now been found that stable pesticidal agents are obtained when (thio)-phosphoric acid esters are mixed with 0.5 to 30 percent (preferably 1 to 20 percent or better still 1 to 10 percent), based on the weight of the ester, of a compound of the formula I $$R - N = C = X$$

I wherein X is O or N—R and
R is H, alkyl of up to 10 carbon atoms, cycloalkyl of from 6 to 8 carbon atoms, phenyl, halophenyl, alkylphenyl,
wherein the alkyl group contains up to 4 carbon atoms, nitrophenyl or phenylalkyl of 7 to 9 carbon atoms.

In accordance with the invention, there is provided a stabilised phosphoric acid ester composition comprising
A. 100 parts by weight of a phosphoric acid ester compound selected from the group consisting of:
1. a compound of the formula:

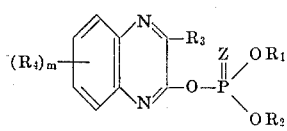

II and 2. a compound of the formula:

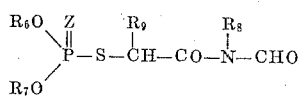

III wherein $R_1$ is alkyl of 1 to 4 carbon atoms,
$R_2$ is —O—$R_5$, —NH—$R_5$ or —N($R_5$)$_2$,
$R_3$ is hydrogen, alkyl of 1 to 4 carbon atoms, alkoxy of 1 to 4 carbon atoms or —COOR$_1$,
$R_4$ is hydrogen, alkyl of 1 to 4 carbon atoms, halo or nitro,
m is 1, 2, 3 or 4,
$R_5$ is alkyl of 1 to 4 carbon atoms,
each of $R_6$ and $R_7$ is independently methyl or ethyl,
$R_8$ is alkyl of 1 to 3 carbon atoms,
$R_9$ is hydrogen or alkyl of 1 to 3 carbon atoms, and
Z is oxygen or sulfur, and
B. between 0.5 and 30 parts by weight of a stabilising compound of the above formula I.

The following phosphoric or thiophosphoric acid esters of formulae II and III are especially suitable for use in the compositions of the invention:
O.O-dimethyl-O-quinoxalyl-(2)-thionophosphate,
O.O-diethyl-O-quinoxalyl-(2)-thionophosphate,
O.O-dimethyl-O-(3-methyl-quinoxalyl-(2)-thionophosphate,
O-methyl-N-propyl-O-quinoxalyl-(2)-phosphoramidate,
O.O-diethyl-O-quinoxalyl-(2)-phosphate,
N-methyl-N-formylamide of O.O-dimethyl-dithiophosphoryl acetic acid,
N-methyl-N-formylamide of O.O-diethyl-dithiophosphoryl acetic acid,
N-ethyl-N-formylamide of O.O-dimethyl-dithiophosphoryl acetic acid,
N-methyl-N-formylamide of α-(O.O-dimethyl-dithiophosphoryl)-propionic acid.

Examples of especially suitable compounds of formula I are:
a. isocyanates, especially
   n-butylisocyanate,
   benzyl-isocyanate,
   phenylisocyanate,
   4-chlorophenylisocyanate,
   3.4-dichlorophenylisocyanate,
   hexamethylenediisocyanate,
   tolylenediisocyanate, and
   cyclohexylisocyanate,
b. carbodiimides, especially
   N.N'-di-o-tolylcarbodiimide,
   N.N'-dicyclohexylcarbodiimide, and
   N.N'-bis-(2.6-diethylphenyl)-carbodiimide,
c. cyanamide.

Cyclohexylisocyanate and N.N'-dicyclohexylcarbodiimide are preferred compounds of formula I.

In addition to the compound of the formula I, it is further possible to add to the compositions of the invention any other adjuvants normally used with pesticidal compositions, e.g. suitable solvents, carriers or emulsifiers.

The compositions of the present invention are useful pesticides (insecticides) and are used in the same way as conventional unstabilised compositions containing pesticidal phosphoric or thiophosphoric acid esters.

The compositions can, if desired, be diluted with conventional diluents, e.g. water or common agriculturally acceptable organic solvents, before application to a locus to be protected from pests (insects). Formulations suitable for use in the application of the stabilised compositions of the invention to a locus generally contain between 0.01 and 90 percent, and preferably between 5 and 50 percent, of the pesticidal phosphoric or thiophosphoric acid ester depending on the mode of application used.

The formulations can be applied to the locus to be protected from the pests (insects), e.g. to growing crops, trees or bushes, as a spray. Such application can be made directly to the locus during the period of pest (insect) infestation, or alternatively the application can be made in advance of an anticipated pest (insect) infestation to prevent such infestation. For example the formulations can be applied as foliar sprays, but can also be applied as sprays directed to the surface of the soil.

The presence of the compounds of the formula I as exemplified hereinafter can increase the shelf life of the (thio)-phosphoric acid esters by a multiple.

The term "low" as used to qualify alkyl or alkoxy radicals preferably indicates those of said radicals which contain up to 4 carbon atoms.

In the following Examples the parts and percentages are by weight and the temperatures stated in degrees Centigrade.

EXAMPLE 1 a. An active agent concentrate A suitable for emulsification in water is stored for 20 days at 70° in closed glass flasks; said concentrate consists of 25 parts of O.-O-diethyl-O-quinoxalyl-(2)-thionophosphate, 10 parts of emulsifier and 65 parts of Shellsol R (registered Trade Mark); Shellsol R is an aromatic hydrocarbon fraction having b.p. 203–289° and may be obtained from Shell N.V., Pernis, Holland.

After storing, the content of O.O-diethyl-O-quinoxalyl-(2)-thionophosphate has fallen to 6 parts; the preparation has become very dark and its emulsification power has almost completely disappeared.

b. A composition in which 3 parts of the Shellsol R has been replaced with 3 parts of phenylisocyanate, but which has otherwise the constitution given at (a) above, still contains 24 parts of the said active agent after exactly similar storage. Its appearance is still light and it can be emulsified without difficulty.

In the following Table 1 there are listed analogous preparations which are obtained by replacing in the active agent concentrate A described in Example 1 corresponding amounts of Shellsol R with the amounts of n-butylisocyanate, or cyclohexylisocyanate, or 4-chlorophenylisocyanate, or N.N'-dicyclohexylcarbodiimide in the amounts stated in Table 1. These further preparations, after exactly similar storage as in Example 1, i.e. after 20 days at 70° in glass flasks, still have a light appearance, are easily emulsifiable and contain the following amounts of active agent:

Table 1

Active agent content after 20 days at 70° (initial value: 25 parts)

| Example | Stabilizer | Amount of stabilizer | Active agent content |
| --- | --- | --- | --- |
| 1(a) | None | 0 | 6 parts |
| 2 | n-butylisocyanate | 1 part | 24.3 parts |
| 3 | cyclohexylisocyanate | 2 parts | 24.3 parts |
| 4 | 4-chlorophenylisocyanate | 3 parts | 23 parts |
| 5 | N.N'-dicyclohexylcarbodiimide | 3 parts | 24.5 parts |

EXAMPLE 6 a. An emulsifiable active agent concentrate B is stored for 5 days at 70° in closed glass flasks; the concentrate consists of 25 parts of O.O-dimethyl-O-quinoxalyl-(2)-thionophosphate, 10 parts of emulsifier, 55 parts of xylene and 10 parts of Shellsol R. After storage, the O.O-dimethyl-O-quinoxalyl-(2)-thionophosphate content has fallen to 13.7 parts.

b. An otherwise similar composition as at (a), but in which 3 parts of xylene have been replaced with 3 parts of n-butylisocyanate, still contains 23 parts of the said active agent after exactly the same storage.

EXAMPLE 7

A mixture of 100 parts of O.O-diethyl-O-quinoxalyl-(2)-thionophosphate and 2 parts of dicyclohexylcarbodiimide is stored in a closed flask for 4 weeks at 50°; the analysis of the brown liquid shows an O.O-diethyl-O-quinoxalyl-(2)-thionophosphate content of 95 percent, i.e. degradation amounts to only about 3 percent after taking into account the content of dicyclohexylcarbodiimide originally present. When the same active agent is stored under exactly similar conditions for 4 weeks at 50°, but without any dicyclohexylcarbodiimide, a black product results which has completely solidified and shows only 42 percent of active agent content on analysis.

EXAMPLE 8

A mixture of 100 parts of O.O-diethyl-O-quinoxalyl-(2)-thionophosphate and 2 parts of cyclohexylisocyanate is heated as in Example 7 for 4 weeks to 50°. Analysis of the still clear brown oil shows an active agent content of 95 percent (degradation = 3 percent), while the active agent without cyclohexylisocyanate constitutes a black hardened mass containing only 42 percent of active agent.

EXAMPLE 9

A mixture of 5 parts of O.O-dimethyl-O-quinoxalyl-(2)-thionophosphate, 0.5 parts of emulsifier as in Example 1, 1 part of cyclohexylisocyanate and 13.5 parts of Shellsol R is dissolved in 65 parts of dry ether; 80 parts of pumice granulate are evenly impregnated with this solution and the ether is then evaporated; this gives rise to 100 parts of granulate which is suitable, for example, for treating soil.

The granulate is heated in a closed glass flask to 50°. After 4 weeks, analysis shows a content of O.O-dimethyl-O-quinoxalyl-(2)-thionophosphate amounting to 4.15 percent.

An otherwise similar composition, but without cyclohexylisocyanate, no longer shows any content of O.-O-dimethyl-O-quinoxalyl-(2)-thionophosphate after exactly the same heat treatment.

EXAMPLE 10 a. An active agent concentrate C which is emulsifiable in water is stored for 11 days at 70° in glass flasks (which are carefully closed); the concentrate consists of 25 parts of O.O-dimethyl-O-(2-isopropyl-4-methylpyrimidyl)-(6)-thionophosphate, 10 parts of emulsifier, 10 parts of Shellsol R, as well as 55 parts of xylene.

After storage, the preparation shows only a content of 15 parts of the said active agent on analysis.

b. An otherwise similar composition as at (a), but in which 2 parts of xylene have been replaced with 2 parts of cyclohexylisocyanate, after exactly the same storage, shows an active agent content of 22.2 parts.

EXAMPLE 11

A water emulsifiable active agent concentrate D is stored at 70° for 14 days in a carefully closed glass flask; said concentrate consists of 25 parts of O.O-diethyl-O-(2-isopropyl-4-methyl-pyrimidyl)-(6)-thionophosphate, 10 parts of emulsifier, 10 parts of Shellsol R, as well as 45 parts of xylene. After storage, analysis of the composition shows no active agent content, while an otherwise similar composition, but in which 2 parts of xylene have been replaced with 2 parts of N,N'-dicyclohexylcarbodiimide, still shows a content of 25 parts of the said active agent after exactly the same storage.

EXAMPLE 12 a. A mixture consisting of 80 parts of the N-methyl-N-formylamide of O.O-dimethyldithiophosphoryl acetic acid (active agent), 18 parts of Shellsol R, 2 parts of cyclohexylisocyanate is heated for 8 weeks to 50° in a carefully closed flask and is then analysed; 76 parts of the said active agent (= 95 percent based on the initial amount) still remain.

b. A mixture consisting of 82 parts of the active agent mentioned at (a) above and 18 parts of Shellsol R, after exactly the same storage, when analysed, shows only 71 parts of the said active agent (= 87 percent of the initial amount present).

EXAMPLE 13

An emulsifiable active agent concentrate consisting of 25.1 parts of quinoxalyl-(2)-O-methyl-N-isopropyl-phosphoramidate, 10 parts of emulsifier, 32.4 parts of cyclohexanone and 32.5 parts of a commercial xylene mixture is stored for 1 week at 70° in a carefully closed glass flask; after this time, black discoloration has occurred and the emulsifiable concentrate on analysis shows no active agent content. However, when in the same mixture two parts of xylene mixture are replaced with 2 parts of dicyclohexylcarbodiimide, the composition shows after exactly the same storage the full active agent content and its appearance is practically unaltered.

EXAMPLE 14

When a solution of 26 parts of quinoxalyl-(2)-O-methyl-N-sec.-butyl-phosphoramidate (active agent) in 74 parts of cyclohexanone is heated to 70° in a carefully closed glass flask, analysis shows no active agent content after heating for 1 week. However, when in this solution 3 parts of cyclohexanone are replaced with 3 parts of dicyclohexylcarbodiimide, 23.3 parts of active agent are still found after exactly the same heat treatment.

What is claimed is:

1. A stabilized insecticidal composition comprising:

A. 100 parts by weight of a compound selected from the group consisting of:
   1. a compound of the formula:

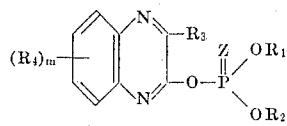

and 2. a compound of the formula:

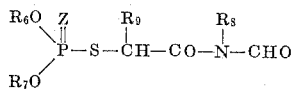

wherein
   $R_1$ is alkyl of 1 to 4 carbon atoms,
   $R_2$ is $-O-R_5$, $-NH-R_5$ or $-N(R_5)_2$,
   $R_3$ is hydrogen, alkyl of 1 to 4 carbon atoms, alkoxy of 1 to 4 carbon atoms or $-COOR_1$,
   $R_4$ is hydrogen, alkyl of 1 to 4 carbon atoms, or halo,
   $m$ is 1, 2, 3 or 4,
   $R_5$ is alkyl of 1 to 4 carbon atoms,
   each of $R_6$ and $R_7$ is independently methyl or ethyl,
   $R_8$ is alkyl of 1 to 3 carbon atoms,
   $R_9$ is hydrogen or alkyl of 1 to 3 carbon atoms, and
   Z is oxygen or sulfur, and B. between 0.5 part to 30 parts by weight of a stabilizing compound of the formula

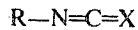

wherein
   X is oxygen or N—R
   R is hydrogen, alkyl of up to 10 carbon atoms, cycloalkyl of from 6 to 8 carbon atoms, phenyl, phenyl substituted by one or two chloro substituents, phenyl substituted by one or two alkyl substituents in which each alkyl substituent contains up to 4 carbon atoms, nitrophenyl or phenylalkyl of 7 to 9 carbon atoms.

2. The composition of claim 1 in which the stabilizing compound is selected from the group consisting of n-butylisocyanate, benzylisocyanate, cyclohexylisocyanate, phenylisocyanate, 4-chlorophenylisocyanate, 3,4-dichlorophenylisocyanate, hexamethylenediisocyanate, toluenediisocyanate, N,N'-di-o-tolylcarbodiimide, N,N'-dicyclohexylcarbodiimide, N,N'-bis-(2,6-diethylphenyl)-carbodiimide and cyanamide.

3. The composition of claim 1, wherein the phosphoric acid ester compound is selected from the group consisting of
   O.O-dimethyl-O-Quinoxalyl-(2)-thionophosphate,
   O.O-diethyl-O-quinoxalyl-(2)-thionophosphate, O.O-dimethyl-O-(3-methyl-quinoxalyl-(2)-thionophosphate,
O-methyl-N-propyl-O-quinoxalyl-(2)-phosphoramidate,
O.O-diethyl-O-quinoxalyl-(2)-phosphate,
N-methyl-N-formylamide of O.O-diemthyl-dithiophosphoryl acetic acid,
N-methyl-N-formylamide of O.O-diethyl-dithiophosphoryl acetic acid,
N-ethyl-N-formylamide of O.O-dimethyl-dithiophosphoryl acetic acid, and
N-methyl-N-formylamide of α-(O.O-dimethyl-dithiophosphoryl)-propionic acid.

4. The composition of claim 1 in which the phosphoric acid ester is of the formula:

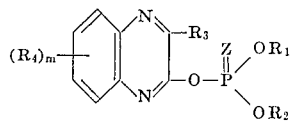

in which
$R_1$ is alkyl of 1 to 4 carbon atoms,
$R_2$ is —O—$R_5$, —NH—$R_5$ or —N($R_5$)$_2$,
$R_3$ is hydrogen, alkyl of 1 to 4 carbon atoms, alkoxy of 1 to 4 carbon atoms or —COOR$_1$,
$R_4$ is hydrogen, alkyl of 1 to 4 carbon atoms, or halo, Z is oxygen or sulfur,
m is 1, 2, 3 or 4, and
$R_5$ is alkyl of 1 to 4 carbon atoms.

5. The composition of claim 4 in which $R_3$ and $R_4$ are hydrogen.

6. The composition of claim 5 in which Z is sulfur, $R_2$ is —OR$_5$ and each of $R_1$ and $R_5$ is methyl.

7. The composition of claim 5 in which Z is sulfur, $R_2$ is —OR$_5$ and each of $R_1$ and $R_5$ is ethyl.

8. The composition of claim 7 in which the stabilizing compound is selected from the group consisting of phenylisocyanate, n-butylisocyanate, cyclohexylisocyanate, 4-chlorophenylisocyanate and N,N'-dicyclohexyl-carbodiimide.

9. The composition of claim 1 in which the phosphoric acid ester is of the formula:

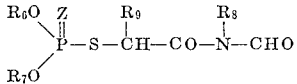

in which each of
$R_6$ and $R_7$ is independently methyl or ethyl,
$R_8$ is alkyl of 1 to 3 carbon atoms,
$R_9$ is hydrogen or alkyl of 1 to 3 carbon atoms, and Z is oxygen or sulfur.

10. The composition of claim 9 in which each of $R_6$, $R_7$ and $R_8$ is methyl, $R_9$ is hydrogen and Z is sulfur.

11. The composition of claim 10 in which the stabilizing compound is cyclohexylisocyanate.

* * * * *